S. L. GOODIN.
WIRELESS CHECK ROW CORN PLANTER.
APPLICATION FILED JUNE 29, 1911.
1,030,236.
Patented June 18, 1912.
2 SHEETS—SHEET 1.
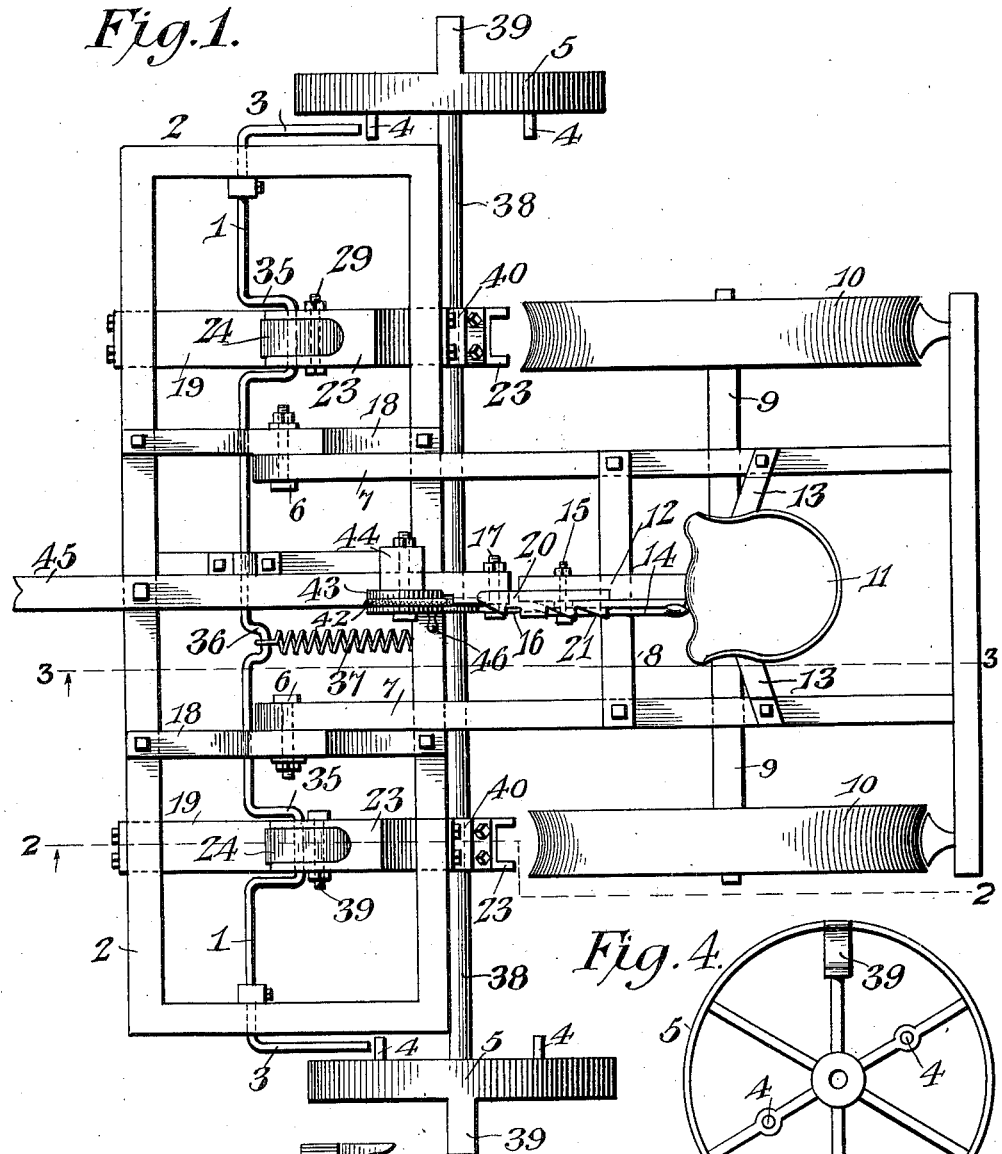
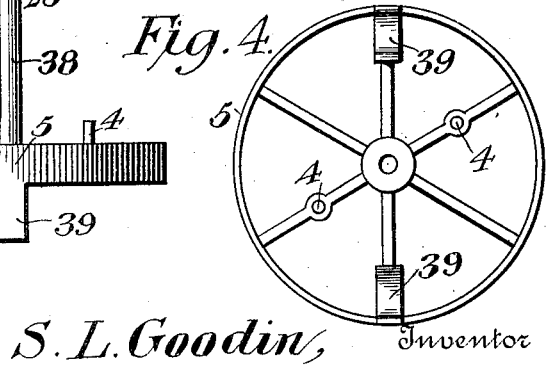
S. L. Goodin, Inventor
Witnesses

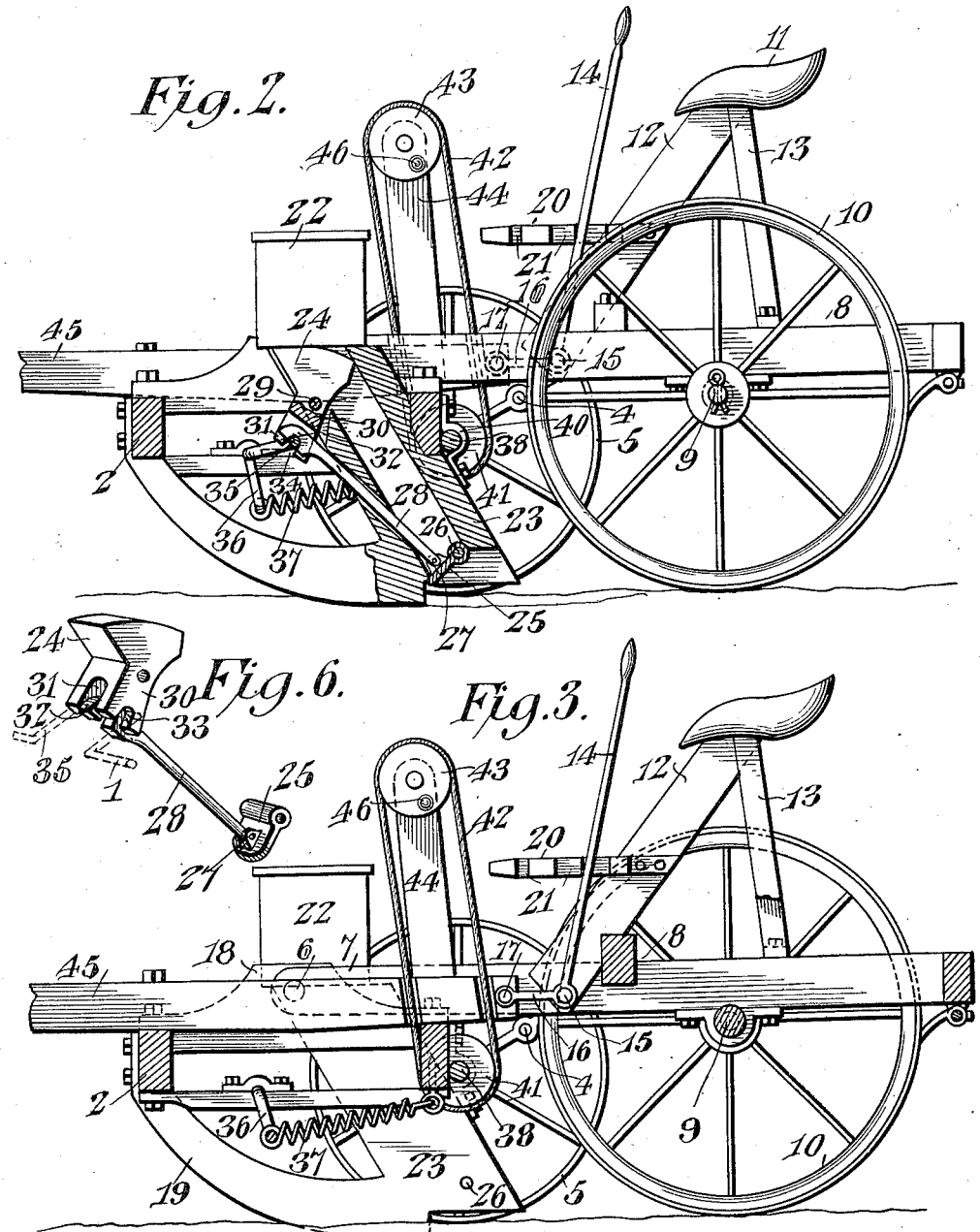

UNITED STATES PATENT OFFICE.

SEBASTION L. GOODIN, OF FARBER, MISSOURI.

WIRELESS CHECK-ROW CORN-PLANTER.

1,030,236.　　　　Specification of Letters Patent.　　Patented June 18, 1912.

Application filed June 29, 1911. Serial No. 636,079.

*To all whom it may concern:*

Be it known that I, SEBASTION L. GOODIN, a citizen of the United States, residing at Farber, in the county of Audrain and State of Missouri, have invented a new and useful Wireless Check-Row Corn-Planter, of which the following is a specification.

The invention relates to a wireless check row corn planter.

The object of the present invention is to improve the construction of wireless check row corn planters, and to provide a simple, inexpensive and efficient check row attachment, adapted to be readily applied with little change to various corn planters, and equipped with means for enabling the marker wheels to be easily adjusted at the end of a row, or in the field should the machine get out of check.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a planter provided with a wireless check row attachment, constructed in accordance with this invention. Fig. 2 is a longitudinal sectional view on the line 2—2 of Fig. 1. Fig. 3 is a similar view on the line 3—3 of Fig. 1. Fig. 4 is a side elevation of one of the marker wheels. Fig. 5 is an end elevation of the same. Fig. 6 is a detail perspective view of the upper cut-off and lower valve of the seed dropping mechanism.

Like numerals of reference designate corresponding parts in all the figures of the drawings.

In the accompanying drawings in which is illustrated the preferred embodiment of the invention, 1 designates a continuous transverse rock shaft, extending entirely across the front or runner frame 2 of a corn planter and provided with end arms 3, arranged exteriorly of the front or runner frame 2 and located in the path of and adapted to be engaged by tappets 4 of a marker wheel 5. The front or runner frame 2 is provided with suitable bearings for the transverse shaft 1, and it is connected by opposite pivot bolts 6 with arms 7 of a main wheeled frame 8. The main rear frame is provided with an axle 9, and is supported by covering wheels 10, and is equipped with a seat 11 for the accommodation of the driver. The seat is supported by a front inclined standard 12 and rear laterally extending inclined standards 13, connected at their upper ends to the upper end of the front inclined standard 12 and suitably secured at their lower ends to the main rear frame.

The front or runner frame, which is hinged or pivotally connected with the main rear frame, is adjusted by means of an upright lever 14, pivoted at the bottom to the front inclined standard 12 at the lower end thereof by means of a bolt or pin 15, and having a short forwardly extending arm 16, which is pivoted by a bolt or pin 17 to the rear portion of the tongue 45 mounted on the front or runner frame. The arms 7, which project forwardly from the rear frame, consist preferably of extensions of the side bars thereof, and the front or runner frame, which is approximately oblong, as clearly illustrated in Fig. 1 of the drawings, is provided with spaced bars 18, extending longitudinally of the planter and connected at an intermediate point with the front ends of the said arms 7 by bolts 6. The front or runner frame is adapted to be adjusted to raise and lower its runners 19, and it is secured in its adjustment by means of a horizontally disposed bar 20, extending forwardly from the front standard 12 and provided at intervals with teeth 21, beveled at their front sides and shouldered at their inner or rear ends and adapted to be engaged by the adjusting lever 14. The front or runner frame is equipped with seed hoppers 22, located above inclined grain spouts 23 in which are mounted an upper cut-off 24 and a lower valve 25. The valve 25 is hinged at its rear edges by means of a transverse pintle 26, and it extends downwardly and forwardly from the same, and it is connected by a suitable hinge joint 27 with the lower end of an inclined link 28. The upper cut-off 24, which is mounted on a transverse pivot 29, is provided with a depending forwardly extending arm 30, having a slot or bifurcation 31 to receive the upper end of the link 28. The upper end of the link 28 is enlarged to form a head 32, and the latter and the depending arm of the cut-off 24 are provided with alined notches 33 and 34, which receive a crank bend or arm 35 of the transverse rock shaft. The transverse rock shaft is provided at opposite sides of the machine with the crank bends 35 for operating the upper cut-off 24 and the lower valve of each of the grain spouts. The crank bend 35, which is approximately U-shaped, extends rearwardly at a slight upward inclination, when the rock shaft is in its normal position, and by engaging the notch 33 of the link 28, it maintains the latter in the bifurcation of the depending arm of the upper cut-off 24. The rock shaft is provided near its center with a depending arm or bend 36 to which is connected a coiled spring 37, which maintains the rock shaft in its normal position and returns the rock shaft to such position after the same has been actuated by the tappets of the marker wheels. The coiled spring 37 extends rearwardly from the transverse rock shaft and is suitably secured at its rear end to the front or runner frame. When the rock shaft is actuated, the upper cut-off and the lower valve of each of the grain spouts or tubes are simultaneously oscillated, the cut-off and the valve being opened and closed by the action of the marker wheels and the coiled spring 37.

The marker wheels, which are mounted on a transverse shaft 38, are arranged to run on the ground and are provided at their inner faces with the said tappets 4, and they are equipped at their outer faces with peripherally arranged markers 39, located at spaced points around the periphery of the marker wheels and projecting outwardly therefrom. The markers are tapered outwardly and their outer longitudinal faces are arranged in flush relation with the tread of the marker wheels. In the accompanying drawings, each of the marker wheels is equipped with two tappets and two markers. The number may, of course, be varied to drop the seed at the desired interval and to correspondingly mark the ground, the markers being so disposed with relation to the tappets to mark the ground simultaneously with the dropping of the seed. The marker shaft is journaled in suitable bearings 40 at the rear of the front or runner frame, and it is equipped near its center with a lower grooved pulley 41, which is connected by a belt 42 with an upper groove pulley 43. The belt 42 may consist of a cord, and the pulley 43 is mounted on a standard 44, extending upwardly from the rear portion of the front or runner frame and secured to the same and to the rear portion of the draft pole or tongue 45. The upper pulley 43 is preferably equipped with an eccentrically arranged handle 46 to enable it to be readily rotated for adjusting the marker wheels. By this construction, the marker wheels may be readily adjusted at the end of a row, or in the field should the machine get out of check.

Having thus fully described my invention, what I claim as new and desire to secure by Letters Patent, is:—

1. The combination with a front or runner frame, of a transverse rotary marker shaft extending across the frame, marker wheels mounted on the marker shaft and provided with markers and having tappets, seed dropping mechanism carried by the front or runner frame, a transverse rock shaft extending entirely across the front or runner frame and mounted thereon and provided with arms at both ends arranged in the path of the tappets of the marker wheels, said rock shaft being also provided at points intermediate of its ends with arms connected with the seed dropping mechanism for actuating the same.

2. The combination with a front or runner frame, of a transverse marker shaft extending across the frame, marker wheels mounted on the marker shaft and provided with markers and having tappets, seed dropping mechanism carried by the front or runner frame, a transverse rock shaft extending entirely across the front or runner frame and mounted thereon and provided with end arms and arranged in the path of the tappets of the marker wheels, said rock shaft being also provided with arms connected with the seed dropping mechanism for actuating the same, and operating mechanism for rotating the marker shaft including a lower pulley mounted on the marker shaft, an upper pulley mounted on the runner frame, and a belt connecting the upper and lower pulleys.

3. The combination of a front or runner frame provided at its rear portion with a standard, a transverse marker shaft extending across the rear portion of the front or runner frame and carried by the same, marker wheels mounted on the ends of the marker shaft and provided with tappets and having markers, seed dropping mechanism carried by the front or runner frame, a transverse rock shaft extending across the front or runner frame and having arms arranged in the path of the tappets of the marker wheel, said rock shaft being also provided with means for connecting it with the seed dropping mechanism, a lower pulley mounted on the marker shaft, an upper pulley supported by the said standard and provided with an actuating handle, and a belt connecting the upper and lower pulleys.

4. The combination of a runner frame, seed dropping mechanism including a grain spout, an upper pivoted cut-off provided with a bifurcated arm having opposite notches, a lower valve, a link connected with the lower valve and provided with a head arranged in the bifurcation of the arm of the upper cut-off and having a notch alined with the said notches, a rock shaft mounted on the runner frame and provided with an arm extending into the said notches and connecting the link and the arm of the upper cut-off, and means for actuating the rock shaft.

In testimony, that I claim the foregoing as my own, I have hereto affixed my signature in the presence of two witnesses.

SEBASTION L. GOODIN.

Witnesses:
   J. D. SUTTON,
   C. A. MAY.

Copies of this patent may be obtained for five cents each, by addressing the "Commissioner of Patents, Washington, D. C."